DICK ROGERS
INVENTOR.

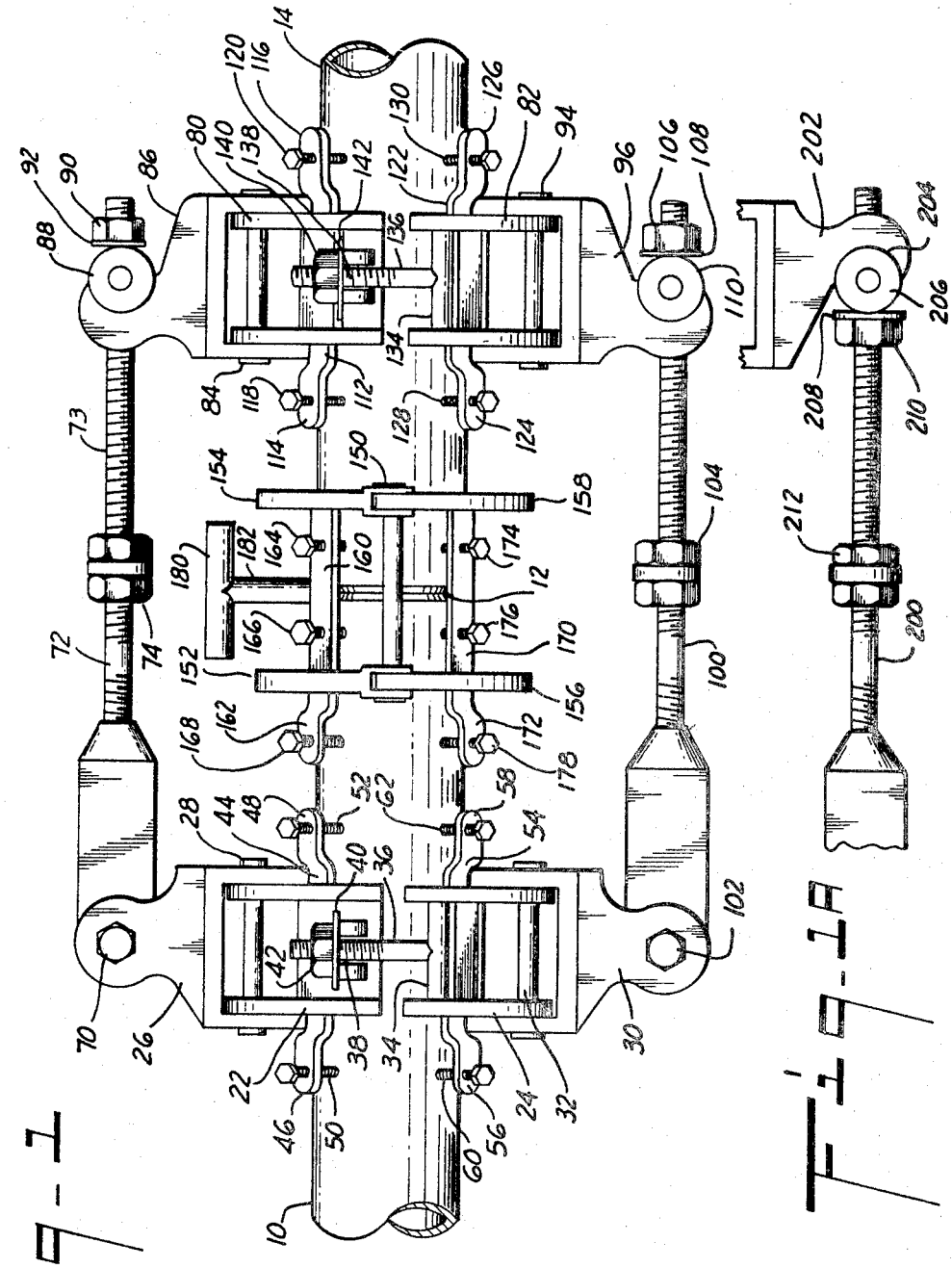

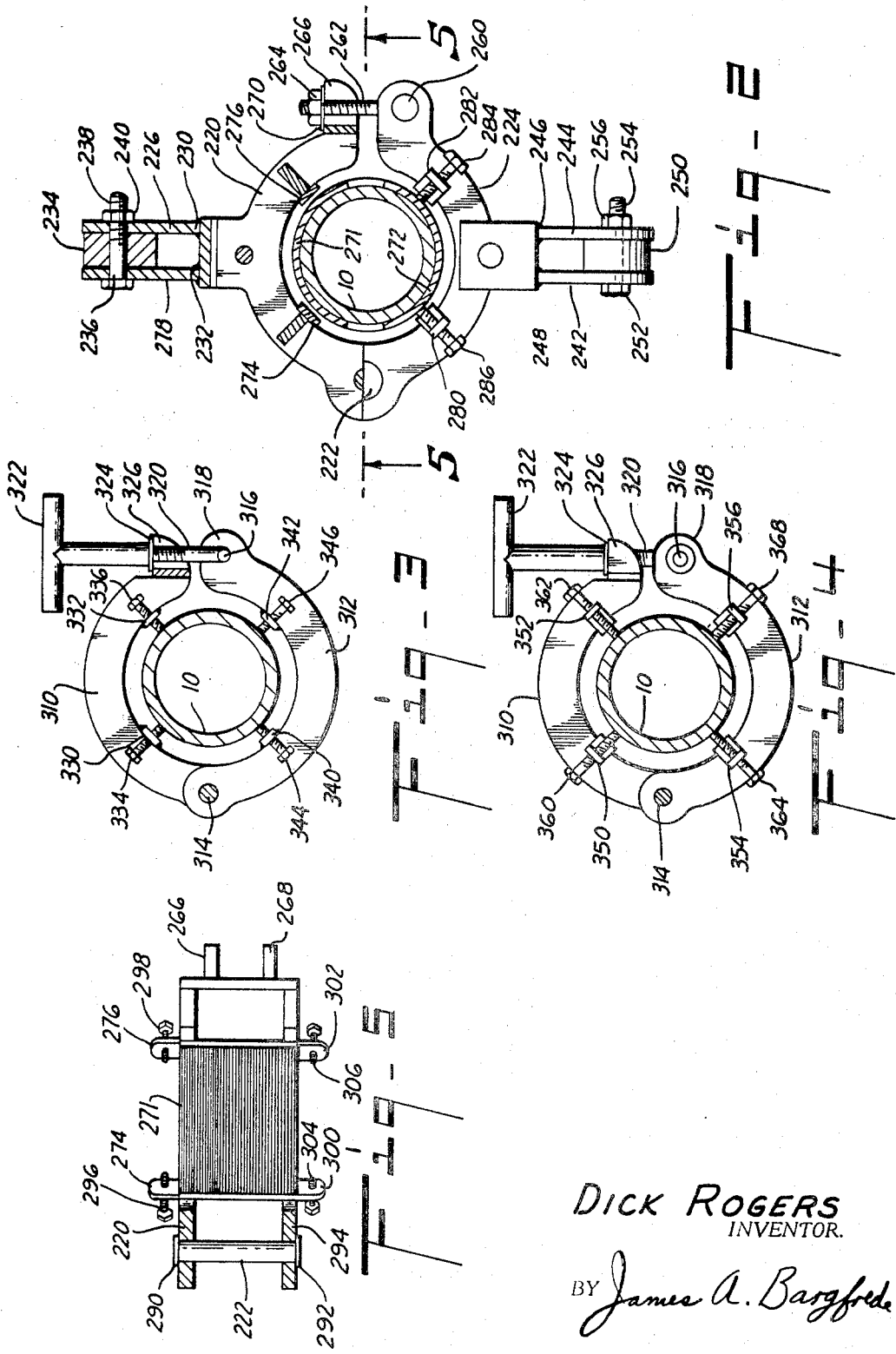

BY James A. Bargfrede

ATTORNEY

United States Patent Office 3,400,872
Patented Sept. 10, 1968

3,400,872
LINEUP CLAMP
Dick Rogers, 608 Don, Pasadena, Tex. 77502
Filed Oct. 4, 1965, Ser. No. 492,480
1 Claim. (Cl. 228—44)

ABSTRACT OF THE DISCLOSURE

Pipe welding lineup clamp apparatus comprising a first clamp means and a second clamp means adjustably linked together by draw bolts. Each of these clamp means are hinged in two sections to allow slipping over pipe sections and a swing bolt is provided on one hinged section and adapted to engage a slotted lug on the other hinged section to latch the clamp in complete encirclement of the pipe. Ears or projected portions are attached to both sides of these clamp sections and are provided with threaded bolts which project radially inward for adjustment to contact the pipe sections to be aligned for rigidly affixing the clamps thereto. The linking draw bolts are pivotally attached at one end to one of the clamp means and are engageable at the other end with a dog hook affixed to the other clamp means. Draw bolt nuts may be rotated either to pull the two clamps together or push them apart, depending on the initial position of the pipe sections to be joined, until the pipe sections are in alignment.

Another clamp useful in aligning pipe sections for welding, also disclosed herein, comprises two sections also hinged for engaging two pipe sections and latched together by a swing bolt and slotted lug similar to the one described previously. Each section includes two semi-circular longitudinally spaced frames yoked together by steel straps. These straps are provided with a plurality of engagement means such as bolts arranged in spaced apart circular fashion providing radial contacts on either side of the junction of the two pipe sections to be joined. The latching swing bolt may be adjustable by hand for drawing the pipe sections into alignment. Another variation of this clamp includes a circular clamp and draw bolt adjustably linked to the frame of the hinged clamp for engagement with the upturned end of a pipe T for alignment with a section of pipe to which it is to be welded.

---

This invention pertains generally to devices used with tubular structures such as pipes and particularly to jigs and clamps utilized in positioning fittings on pipe sections to each other.

In the past twenty years considerable activity has developed in laying pipelines throughout the world. These pipelines carry hydrocarbon products from producing wells to storage and refining areas and such pipelines further carry refined products to market areas where such refined products are consumed. The construction and maintenance of such pipelines has resulted in many problems, particularly in view of the fact that the diameter and wall thickness of such pipelines has increased while the equipment and facilities utilized in laying such pipelines has not kept pace with the increased size of the pipe.

Furthermore, many pipeline operations relating to construction and maintenance are in remote areas where heavy equipment, manpower, and optimum conditions do not exist. This is particularly true now that pipelines are extending into shallow and deep bodies of water where increased drilling and exploration activity for oil and gas is under way. In addition to the problems which have arisen from increased pipeline construction, the use of tubular construction such as pipes has increased substantially in areas where petroleum products are processed. Refineries, for example, utilize sizeable quantities of pipe and pipe connections such as L's, T's, and various flanges. The effective use of pipes and pipe connections has presented many problems from the standpoint of accessibility, weight, manpower, type of equipment, and safety to workmen who are making connections of pipe and pipe fittings.

Known devices have been marketed for some time relating to pipelines and pipe fittings, but such known devices have not provided optimum results in an efficient and economical manner. Some of such known devices are shown in the following United States patents:

1,744,530, issued Sept. 2, 1930, with R. J. Sheehan as inventor.
1,848,527, issued Mar. 8, 1932, with D. W. Hickey as inventor.
1,928,892, issued Oct. 3, 1933, with D. W. Hickey as inventor.
1,952,605, issued Mar. 27, 1934, with Pearson as inventor.
2,080,906, issued May 18, 1937, with Boyer as inventor.
2,754,787, issued July 17, 1956, with Reed as inventor.
2,846,968, issued Aug. 12, 1958, with Tipton as inventor.
3,030,903, issued Apr. 24, 1962, with Morris as inventor.
3,115,859, issued Dec. 31, 1963, with Haussler et al. as inventors.

Although the above listed patents disclose various devices for use on pipes and pipe fittings, none of such devices perform the function of connecting welded pipe to pipe or connecting various fittings to pipe by means of simple mechanical components which generally are operable by a single workman.

Thus an object of the present invention is to provide an improved device utilized in the tubular goods art.

Another object of the present invention is to provide an improved pipe lineup clamp.

Still a further object of the present invention is to provide an improved pipe joint-maker.

Still a further object of the present invention is to provide a lightweight lineup device for use inside a pipe or pipe fitting.

A still further object of the present invention is to provide an improved flange spreader device which may be used with pipes and pipe fittings.

Yet another object of the present invention is to provide an improved pipe jig which may be easily adjusted to accommodate various sizes of pipe.

In the drawings:

FIGURE 1 is a side, elevational view showing one of the lineup clamp devices of the present invention;

FIGURE 1A is a side, elevational view of a push bolt component which may be utilized in conjunction with the present invention;

FIGURE 2 is an end, elevational view showing a clamp device of the present invention;

FIGURE 3 is an end view of the joint-maker clamp device of the present invention showing one type of positioning means;

FIGURE 4 is an end view showing a joint-maker device of the present invention utilizing another form of positioning means;

FIGURE 5 is a sectional, plan view of the clamp shown in FIGURE 2 taken along line 5—5 of FIGURE 2;

Figure 6:
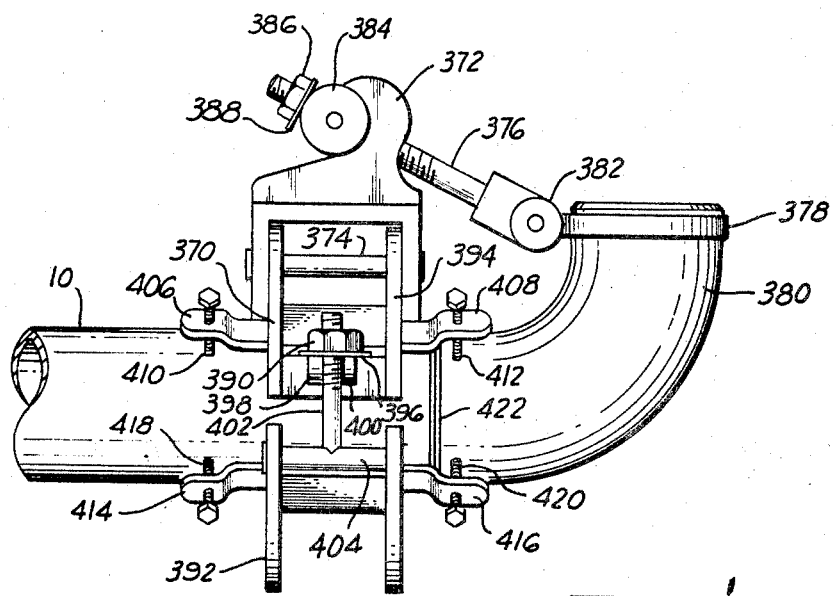
FIGURE 6 is a side, elevational view showing a clamp device incorporated in the present invention when utilized in attaching an elbow to a section of pipe.

Briefly stated the present invention provides apparatus and methods for effectively and quickly lining up tubular members such as pipe with only a single workman. Sections of pipe may be aligned with respect to each other or a section of pipe and a coupling such as a T or an L may be positioned. The apparatus of the present invention is characterized by clamp frame means to which are attached suitable screw means to engage a tubular structure. Hinge pin means may be coupled to the clamp frame means and bolt means may be coupled to the clamp frame means to allow rigid positioning of the members which are to be joined together. The bolt means provide a push-pull effect whereby the sections which are to be joined together may be moved with minimum effort although such sections may be large in size and cumbersome from a weight standpoint. The apparatus and methods of the present invention may be adapted to provide straightening of tubular sections such as pipe thereby allowing such tubular sections to be welded satisfactorily with a minimum of manpower and equipment.

Referring now to the drawings in detail, FIGURE 1 is a side elevational view of the lineup clamps utilized in practicing the present invention. A section of pipe 10 may be joined by suitable means such as welding at 12 to another pipe section 14. Substantially identical clamp members are coupled to pipe section 10 and to the pipe section 14. One clamp which is coupled to pipe section 10 includes a clamp frame 22. Clamp frame 22 is pivotally coupled on the opposite side of the pipe shown in FIGURE 1 so that clamp frame 22 includes clamp member 24 shown in FIGURE 1. Clamp frame 22 is positioned pivotally to dog 26 by pin 28. Clamp member 24 is pivotally coupled to dog 30 through pin 32 of clamp member 24. Clamp member 24 includes a pivotal member 34 having a threaded portion 36 adapted for engagement at opening 38 to clamp 22. Suitable means such as a washer 40 may be positioned between clamp frame 22 to allow a nut 42 to be threadedly coupled to threaded member 36 and thus provide circumferential engagement of clamp frame 22 and clamp member 24 about pipe section 10. Coupled to clamp frame 22 is a member 44. Member 44 has a projection 46 and a projection 48. Projection 46 has a threaded member such as a screw 50 and projection 48 has a threaded member 52 positioned therein whereby members 50 and 52 may be positioned against pipe member 10.

Likewise clamp member 24 includes a member 54 and member 54 includes projections 56 and 58 to which are coupled threaded members 60 and 62 respectively for positioning against pipe 10.

Dog 26 is pivotally coupled by means of member 70 to a draw bolt 72 having threaded portions 73. Back-up nut 74 is welded on draw bolt 72 to provide backup for tightening operations to be more fully understood subsequently.

A similar clamp arrangement is provided for positioning on pipe section 14. A clamp frame 80 is pivotally coupled on the side of the pipe opposite that shown in FIGURE 1 to another clamp member 82. Member 84 couples clamp frame 80 to dog 86 and dog 86 has a member 88 positioned for suitable engagement with draw bolt 72 so that tightening nut 90 may be threadedly moved against member 88. A washer 92 may be positioned between nut 90 and member 88. Pin 94 is coupled to clamp member 82 and engages dog 96. A suitable draw bolt 100 is coupled to dog 90 with pin 102. Backup nut 104 is fixedly positioned on draw bolt 100. Tightening nut 106 is positioned for threaded engagement with washer 108 on member 110 and member 110 engages dog 96. As explained previously in connection with the clamp positioned on pipe 10, member 112 is coupled to clamp member 80 and includes projections 114 and 116 having threaded screws 118 and 120 therein. It will be appreciated that threaded screws 118 and 120 are adapted for positioning on pipe 14.

Clamp member 82 has positioned thereon member 122 which includes projections 124 and 126. Threaded screws 128 and 130 are coupled respectively to projections 124 and 126 to allow threaded screws 128 and 130 to engage pipe 14.

Coupled to clamp member 82 is member 134 having positioned thereon threaded member 136. Threaded member 136 passes through opening 138 for engagement with nut 140. Nut 140 is in engagement with washer 142. Thus it will be appreciated that the clamp members positioned on pipes 10 and 14 may be rigidly coupled to pipe sections 10 and 14 and by manipulation of draw bolts 72, 100 and nuts 90, 106 the pipe sections are brought into substantial alignment for welding.

A smaller clamp having a pivotal pin 150 may be positioned near the area 12 to be welded. Frame members 152 and 154 are pivotally coupled to pin 150 and frame members 156 and 158 likewise are each coupled to pin 150. Member 160 couples members 154 and 152 together with projection 162 extending upwardly away from pipe 10. Member 160 includes threaded screws 164 and 166 with projection 162 accommodating threaded screw 168. Member 170 is coupled between members 156 and 158 with projection 172 extending away from pipe 10. Members 174, 176 and 178 are positioned in member 170 and in projection 172. As will be explained in detail subsequently, handle member 180 is coupled to member 182 for positioning the center clamp over area 12 to be welded.

Thus in viewing FIGURE 1 it will be appreciated that clamp frame 22 and clamp member 24 may be positioned around pipe 10. Then clamp members 80 and 82 may be positioned around pipe 14 so that draw bolts 72 and 100 may be suitably engaged with dogs 86 and 96. Nuts 42 and 140 may be adjusted after adjustment screws 52 and 50 along with adjustment screws 60 and 62 are brought into engagement with pipe 10. Likewise, adjustment screws 118, 120, 128, and 130 are brought into engagement with pipe 14 prior to final positioning of the clamp members. After the clamps have been positioned on two sections of pipes, the smaller clamp may be utilized over the area to be welded and similar positioning of the clamping device is achieved by adjusting screws 178, 176, 174, 164, 166 and 168 and by manipulation of handle 180 on member 182. After tacking or small beads have been provided on certain portions of area 12, the center clamp is removed to complete the welding operation. After the weld has been completed, the larger clamps positioned on pipe section 10 and pipe section 14 are removed and the joint coupling the two sections of pipe together has been completed. It will be appreciated by viewing the clamp components shown in FIGURE 1 that sections of a large diameter pipe having thick walls may be suitably positioned relative to each other by use of the clamping device shown in FIGURE 1. Furthermore a minimum number of men are required to position the clamping device. The manipulation of draw bolts 72 and 100 may be achieved by suitable means such as a wrench positioned on nut 74 and nut 104.

FIGURE 1A is a side, elevational view of a portion of a draw bolt 200 positioned on a dog 202. Dog 202 has a recess 204 to allow positioning of member 206. A washer 208 and nut 210 pushes against dog 202 when member 206 engages recess 204 and nut 210 is turned to engage washer 208. Backup nut 212 is fixedly positioned on draw bolt 200. Thus a pushing effect is provided against dog 202 rather than a pulling effect as shown in FIGURE 1 where draw bolts 72 and 100 are utilized with dogs 86 and 96. Thus it will be apparent in FIGURE 1A that a draw bolt arrangement may easily be achieved in the arrangement of FIGURE 1 by removing pins 94 and 84 to reverse the position of dogs 86 and 96. Therefore, the arrangement shown in FIGURE 1 when utilized with a push bolt of FIGURE 1A will allow a combined pull and push effect to be achieved with the clamping arrangement utilized in the apparatus shown in FIGURE 1.

Referring now to FIGURE 2 and to FIGURE 5, FIGURE 2 is an end elevational view of a clamp device similar to the clamp device shown in FIGURE 1 with FIG- URE 5 being a sectional, plan view taken along line 5—5 of FIGURE 2. FIGURE 2 shows an upper clamp member 220 pivotally coupled by suitable means such as a bolt 222 to a lower clamp member 224. A dog arrangement which includes members 226 and 228 may be coupled by suitable means such as welds 230 and 232 to the upper clamp member 220. Positioned in dog members 228 and 226 is a draw bolt 234 which is coupled by a bolt 236 to members 228 and 226. Bolt 236 includes a threaded end 238 on which is positioned a nut 240. A similar arrangement is found coupled to lower clamp member 224. Dog members 242 and 244 may be coupled by welds 246 and 248 to the lower clamp member 224. A draw bolt 250 is positioned between members 242 and 244 and is held in pivotal arrangement by a bolt 252 having a threaded end 254 on which is coupled a nut 256.

Lower clamp member 224 includes a pivotal bolt 260 having threads 262 on which a nut 264 may be positioned for engagement with member 266 shown in FIGURE 2 as well as with member 268 shown in FIGURE 5. It will be appreciated that a washer 270 or other suitable means may be positioned between nut 264 and members 266 and 268 to allow positioning of upper clamp member 220 and lower clamp member 224 around a tubular structure 10. Disposed at least partially on the circumference of tubular structure 10 are suitable nonslip dog members 271 and 272. Nonslip dog member 271 is positioned between members 274 and 276 of upper clamp member 220. As shown in connection with lower clamp member 224 members 280 and 282 have suitable fastening means such as bolts 284 and 286 positioned thereon to allow engagement of nonslip dog 272 with tubular member 10. Thus it will be appreciated in viewing FIGURE 2 that the clamp member shown in FIGURE 2 is opened by loosening nut 264 to allow upper clamp member 220 and lower clamp member 224 to be positioned around tubular structure 10. The clamp member is enclosed and fastener bolt 260 is positioned between member 266 and 268 to allow washer 270 to engage member 266 and 268 when nut 264 is tightened. Fastening members such as bolts 286 and 284 are positioned for allowing the nonslip dogs to engage tubular structure 10. After such engagement the draw bolt members 234 and 250 may be positioned for engagement with other clamp members positioned on tubular structure 10.

Referring to FIGURE 5, it will be appreciated that pivotal coupling 222 includes an enlarged portion 290 at one end and a similar enlarged portion 292 at the other end for engagement with member 220 and member 294. Member 274 and member 276 are shown in FIGURE 5 and bolts 296 and 298 are positioned thereon. Member 300 and member 302 have bolts 304 and 306 positioned thereon in a similar manner. Also visible in FIGURE 5 is the nonslip dog 271 which may be of any suitable construction to provide a nonslip feature so that the clamp may be positioned on a section of the tubular member 10 without slippage.

FIGURE 3 is an end view of a clamp similar to the central clamp shown in FIGURE 1 positioned on a tubular member 10. The clamp includes an upper member 310 and a lower member 312 pivotally coupled by member 314. A pivotal pin member 316 is positioned on end 318 of lower member 312 and a threaded member 320 is coupled to pin 316. Threaded member 320 has a suitable handle member 322 adapted for threaded engagement with member 320 so that a washer 324 positioned on member 326 of the upper member 310 may engage such member 326 when the handle 322 is turned to allow positioning of clamp on tubular member 10. Upper member 310 has members 330 and 332 which have positioned therein bolts 334 and 336. Likewise lower member 312 includes members 340 and 342 with bolts 344 and 346 positioned therein.

It will be appreciated from viewing FIGURE 3 that when a clamp such as shown in FIGURE 3 is to be positioned on tubular member 10 that the upper and lower members 310 and 312 are pivotally moved apart and the handle and bolt assembly is positioned with the bolts 334, 336, 344 and 346 being adjusted to engage tubular member 310 for positioning as shown in FIGURE 1.

FIGURE 4 is an end view of a clamp similar to the clamp shown in FIGURE 3 except that a view is presented showing the outer portion of the clamp wherein members 350 and 352 along with members 354 and 356 are visible. Pivotal member 314 is shown coupling upper member 310 to lower member 312 and pin 316 is positioned in the end 318 of lower member 312. Threaded bolt 320 is shown positioned between member 326 so that washer 324 may be positioned on member 326 and handle 322 rotated to allow engagement of upper member 310 and lower member 312 with tubular structure 10. Bolts 360, 362, 364 and 368 are positioned respectively in members 350, 352, 354 and 356 so that engagement may be provided with the outer surface of tubular member 10.

FIGURE 6 is a side, elevational view showing a clamp of the present invention utilized in positioning a T on another tubular member prior to joining the T to such other member by welding. A tubular member 10 has coupled thereon a clamp assembly 370 the construction and operation of which has been explained previously. Suitable dogs 372 are positioned on clamp 370 by means of member 374. A draw bolt 376 is coupled to a clamp 378 which is positioned on T member 380. Draw bolt 376 is pivotally coupled with a pin 382 to clamp member 378. Draw bolt 376 is positioned on dog 372 and member 384 is in engagement with dog 372. A bolt 386 is coupled to draw bolt 376 with a washer 388 positioned between bolt 386 and member 384. It will be appreciated that when clamp 370 is positioned on tubular member 10 that bolt 390 is tightened to join lower portion 392 with the upper portion 394. Washer 396 engages member 398 and member 400 so that threaded member 402 which is coupled to pivotal member 404 is brought close to upper member 394 of clamp 370. Member 406 and member 408 are positioned on upper member 394 and have positioned therein bolts 410 and 412 respectively. Likewise lower member 392 has positioned thereon members 414 and 416. Member 414 has a bolt 418 and member 416 has a bolt 420 positioned thereon so that the tubular member 10 may be positioned properly with respect to T 380. After proper positioning of clamp 370 is provided, the draw bolt 376 and clamp 378 are utilized to permanently position tubular member 10 with respect to elbow 380. After proper positioning a weld may be provided at 422. It will be obvious that after the L 380 and tubular member 10 have been joined together that the clamp 378 may be removed along with clamp 370. It further will be obvious that the assembly shown in FIGURE 6 provides a decided improvement over known devices which are cumbersome and generally are not readily available for positioning an L onto a straight section of a tubular member such as a pipe.

Figure 7:
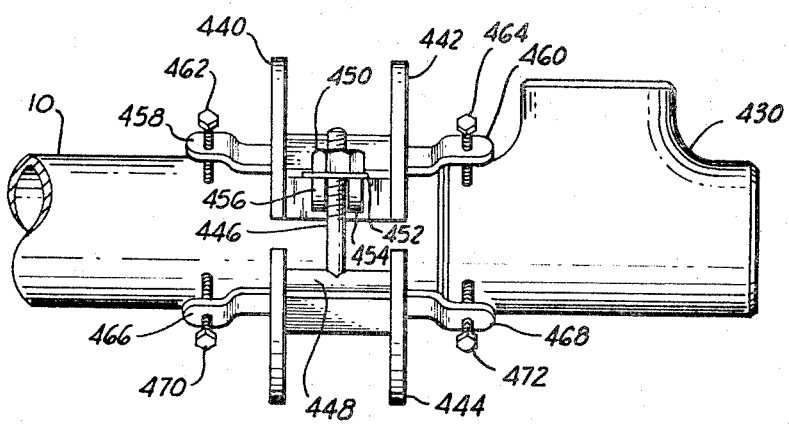
FIGURE 7 is a side, elevational view of a clamp device of the present invention shown joining a T to a section of pipe.

FIGURE 7 is a side, elevational view of a clamp of the present invention utilized in joining a tubular structure 10 to a T 430. A clamp 440 is utilized with upper section 422 being coupled to a lower section 440 by means of a threaded bolt 446. Bolt 446 is coupled to pivotal pin 448 and a suitable nut 450 is positioned on a washer 452 which is in engagement with members 454 and 456. Member 458 and member 460 are positioned on upper member 444 and have bolts 462 and 464 positioned respectively on members 458 and 460. Lower member 444 has members 466 and 468 with bolts 470 and 472 positioned thereon respectively. It will be obvious that the bolts or jack screws 462, 464, 470 and 472 are utilized in positioning the T 430 with respect to tubular member 10 after bolt 450 has been positioned. The arrangement of the clamp of the present invention shown in FIGURE 7 provides, as does the arrangement shown in FIGURE 6, the positioning of a straight section of pipe or other tubular member onto a fitting such as a T with a minimum of effort and a minimum of manpower. The clamp of the present invention provides a decided improvement over prior art devices, some of which are shown in the above-identified patents.

Thus the present invention provides apparatus and methods for joining various tubular members and tubular fittings in an effective, safe, and reliable manner. The clamp device of the present invention acts in an unexpected manner to provide great force at a needed location on a tubular structure or fitting to be positioned on such tubular structure so that manpower in great amounts is not required nor is heavy machinery required.

Although preferred embodiments of the present invention have been shown and described, it will be appreciated by those skilled in the art that many modifications may be made to the shown and described embodiments without departing from the spirit of the invention defined by the following claim. Although such claim may be presented in indented format to facilitate reading and understanding thereof, such indented format is not to be construed as a structural or functional limitation of the elements or steps recited in such claim.

I claim:
1. Apparatus for positioning first and second sections of pipe relative to each other including in combination
   first clamp means adapted for temporary rigid affixation around said first section of pipe,
   second clamp means adapted for temporary rigid affixation around said second section of pipe, and
   coupling means including a plurality of draw bolts coupled to said first and second means for moving said first and second means relative to each other, at least one end of said draw bolts being adapted to pivot about at least two axes substantially perpendicular to each other.

References Cited
UNITED STATES PATENTS

| | | | |
|---|---|---|---|
| 925,630 | 6/1909 | Goldschmidt et al. | 228—44 |
| 187,937 | 2/1877 | Tolmie | 228—44 |

RICHARD H. EANES, JR., *Primary Examiner.*